US005835326A

United States Patent [19]

Callaway

[11] Patent Number: 5,835,326

[45] Date of Patent: Nov. 10, 1998

[54] ELECTRICAL CORD WITH INTEGRAL SURGE PROTECTION CIRCUITRY

[76] Inventor: Jerry D. Callaway, 55 Corte Alta, Novato, Calif. 94949

[21] Appl. No.: 591,215

[22] Filed: Nov. 17, 1995

[51] Int. Cl.[6] .................................................... H02H 3/00

[52] U.S. Cl. ............................ 361/111; 361/56; 361/118; 361/119

[58] Field of Search ............................ 361/56, 111, 118, 361/42, 45, 119

[56] References Cited

U.S. PATENT DOCUMENTS 3,840,781 10/1974 Brow ...................................... 361/118

4,807,083 2/1989 Austin .................................... 361/118

5,198,955 3/1993 Willner .................................... 361/42

*Primary Examiner*—Jeffrey A. Gaffin

*Assistant Examiner*—Stephen Jackson

*Attorney, Agent, or Firm*—Larry D. Johnson

[57] ABSTRACT

A surge protector circuit is installed in the middle of a standard cordset so that an OEM cordset can also provide surge protection. Telephone line surge protection (e.g., for fax and modem) and coaxial cable surge protection (e.g., for television) may be provided in the same unit.

4 Claims, 4 Drawing Sheets

ELECTRICAL CORD WITH INTEGRAL SURGE PROTECTION CIRCUITRY

BACKGROUND OF THE INVENTION

1. Field of the Invention

This invention relates generally to electronic devices and associated hardware, and more specifically to an improved electrical cord apparatus incorporating integral circuitry for suppression of voltage surges.

2. Description of the Prior Art

Surge protector devices, variously known as voltage spike protectors or voltage surge suppressors, are well known and in widespread use. These devices provide electronic circuitry to protect sensitive electronic equipment from high energy transient disturbances that may occur on an AC power line. Known surge protectors are typically installed at the end of an electrical extension-type cord, terminating in one or more female receptacles, so that the electric power cord of the electronic device to be protected can be plugged into the female receptacle. Indeed, many surge protectors are used simply as extension cords in this fashion.

SUMMARY OF THE INVENTION

The electrical cord with integral surge protection circuitry of this invention provides a surge protector circuit (such as any circuit well-known in the art) installed in the middle of a standard cordset. This enables an OEM cordset, routinely supplied with electronic gear such as televisions and computers, to also provide surge protection. A further aspect of the invention is that it in addition to power line surge protection, it may also provide telephone line surge protection (e.g., for fax and modem) and coaxial cable surge protection (e.g., for television) in the same unit (but preferably electrically isolated), making it ideal for use in computer modem multimedia installations.

In standard industry parlance, a "cord" has a plug at one end (typically male, e.g., NEMA-type or other), and bare wires at the other end for hard wiring into the electronic device of interest. A "cordset" also has a plug at one end, but with an "equipment" plug at the other end (typically female, e.g. IEC-type or other) for plugging into the electronic device of interest. The present invention is not an extension cord, but rather is a "cord" or "cordset" with integral surge protection circuitry.

The surge protection circuitry is installed in the middle of the length of the cord, i.e., at least some distance from either end of the cord. In this way, the circuitry is remote from the electronic device being protected. This prevents equipment damage in the event of a major surge that could damage or even destroy the surge protector. The circuitry is also remote from the other end of the cord, which typically has a male power plug, to avoid interfering with that plug and other plugs that may be placed near that plug (as in a group of plugs inserted into a common outlet).

DETAILED DESCRIPTION OF A PREFERRED EMBODIMENT

Figure 1:
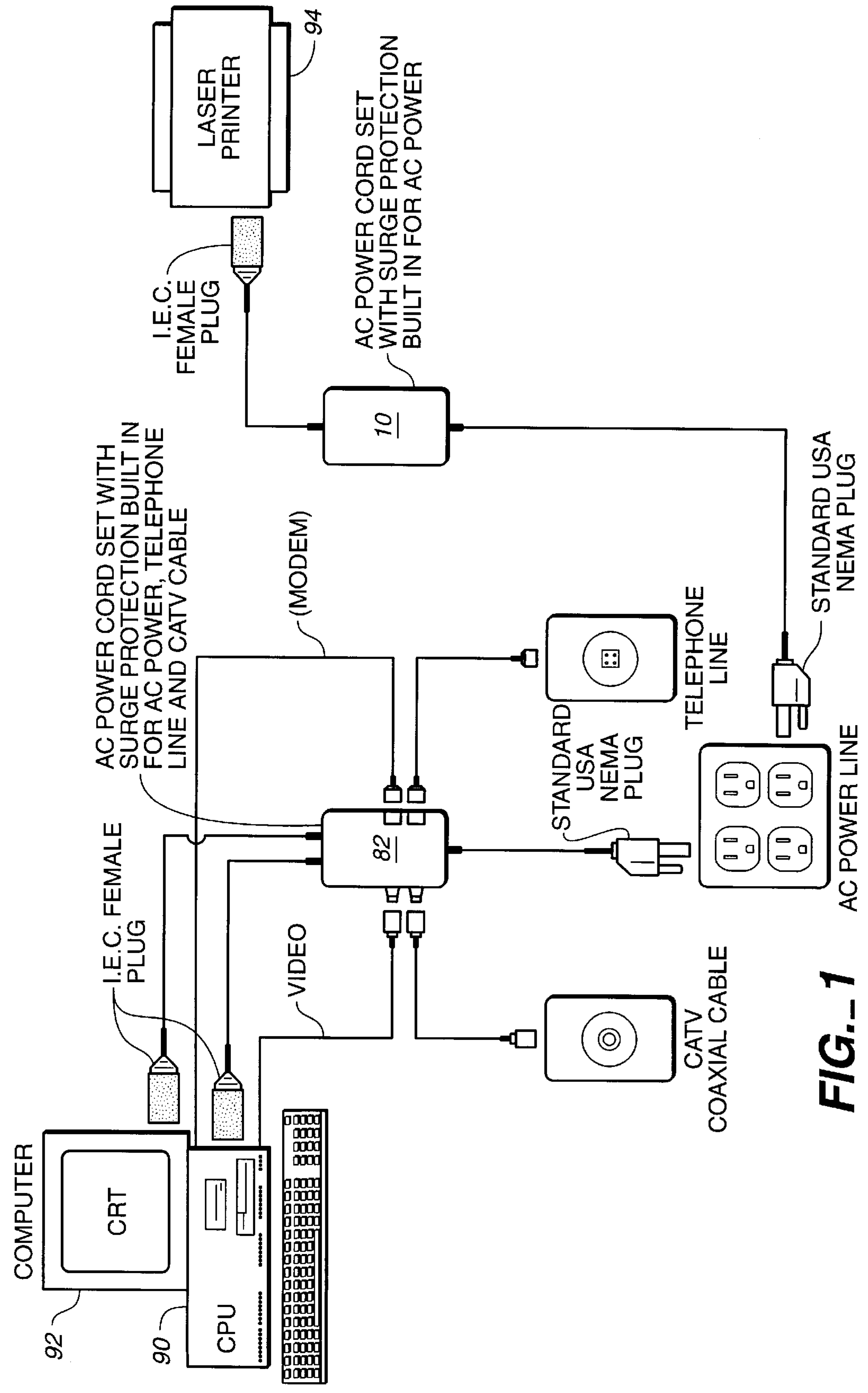
FIG. 1 is a schematic view of an electric cord with integral surge protection circuitry of this invention as installed to protect a multimedia computer system, with a NEMA male/dual IEC female AC power cordset with surge protection built in for AC power, telephone line (modem) and CATV coaxial cable, for protection of a multimedia computer CPU and CRT; and a NEMA male/single IEC female AC power cordset with surge protection built in for AC power, for protection of a laser printer.

FIG. 1 is a schematic view of an electric cord with integral surge protection circuitry of this invention as installed to protect a multimedia computer system, with a NEMA male/dual IEC female AC power cordset 82 with surge protection built in for AC power, telephone line (modem) and CATV coaxial cable, for protection of a multimedia computer CPU 90 and CRT 92; and a NEMA male/single IEC female AC power cordset 10 with surge protection built in for AC power, for protection of a laser printer 94.

Figure 2:
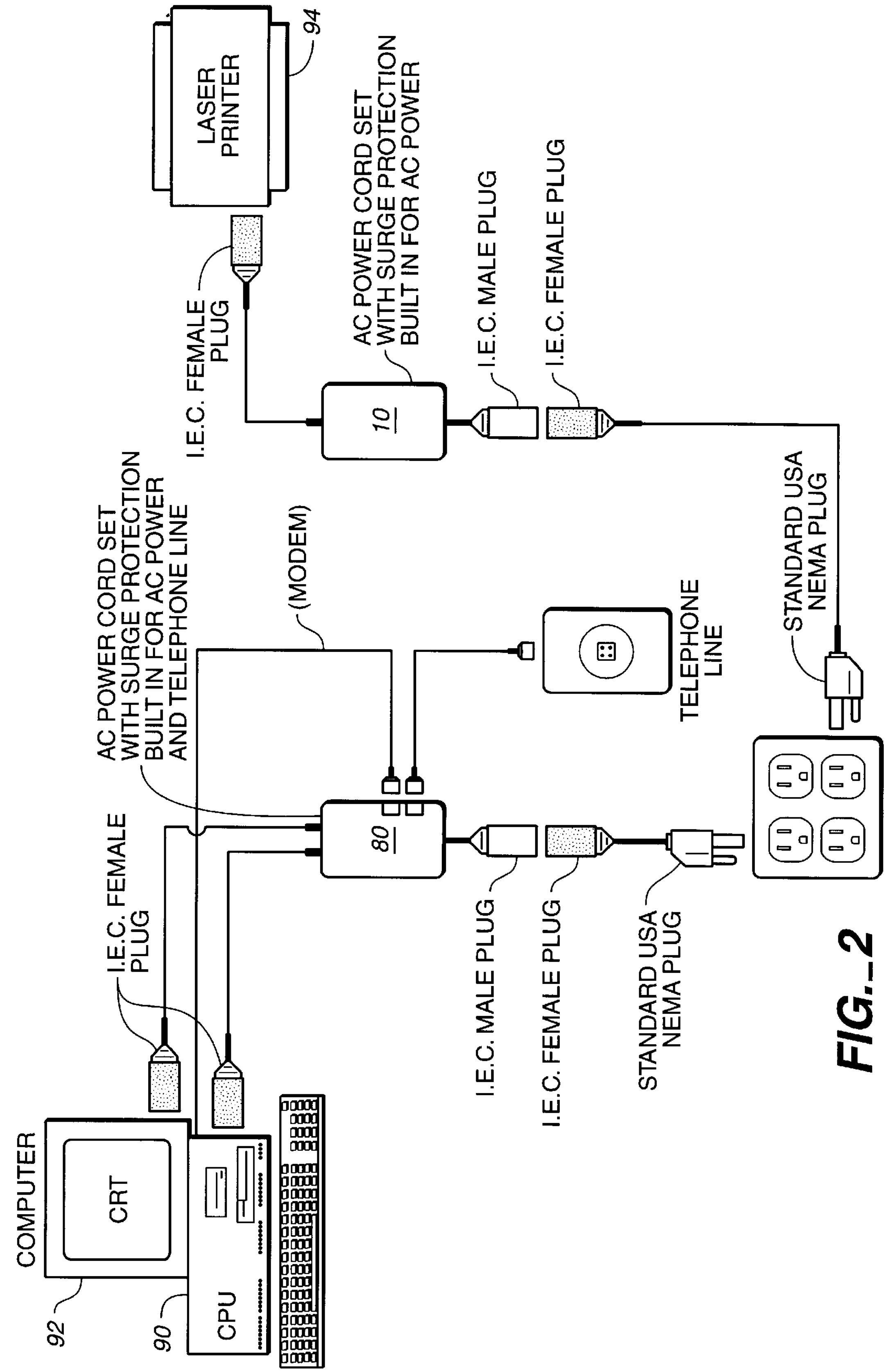
FIG. 2 is a schematic view of an electric cord with integral surge protection circuitry of this invention as installed to protect a standard computer system, with an IEC male/dual IEC female AC power cordset with surge protection built in for AC power and telephone line (modem), for protection of a standard computer CPU and CRT; and an IEC male/single IEC female AC power cordset with surge protection built in for AC power, for protection of a laser printer.

FIG. 2 is a schematic view of an electric cord with integral surge protection circuitry of this invention as installed to protect a standard computer system, with an IEC male/dual IEC female AC power cordset 80 with surge protection built in for AC power and telephone line (modem), for protection of a standard computer CPU 90 and CRT 92; and an IEC male/single IEC female AC power cordset 10 with surge protection built in for AC power, for protection of a laser printer 94.

Figure 3:
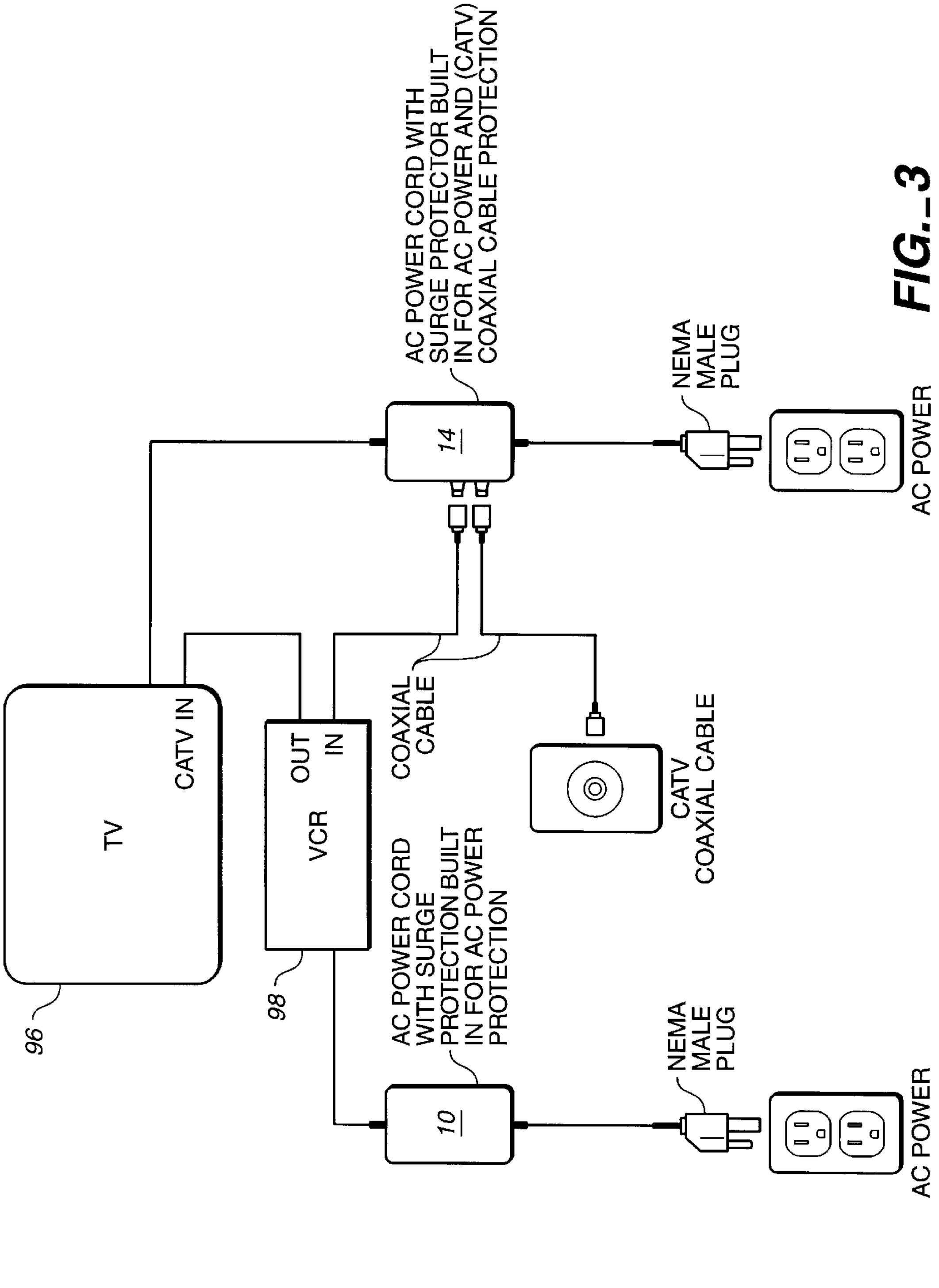
FIG. 3 is a schematic view of an electric cord with integral surge protection circuitry of this invention as installed to protect a television/VCR on a cable system, with a NEMA male/bare wire AC power cordset with surge protection built in for AC power and coaxial cable, for protection of a television and VCR (cable input); and a NEMA male/bare wire AC power cordset with surge protection built in for AC power, for protection of the VCR (power input)

FIG. 3 is a schematic view of an electric cord with integral surge protection circuitry of this invention as installed to protect a television/VCR on a cable system, with a NEMA male/bare wire AC power cordset 14 with surge protection built in for AC power and coaxial cable, for protection of a television 96 and VCR 98 (cable input); and a NEMA male/bare wire AC power cordset 10 with surge protection built in for AC power, for protection of the VCR 98 (power input).

Figure 4:
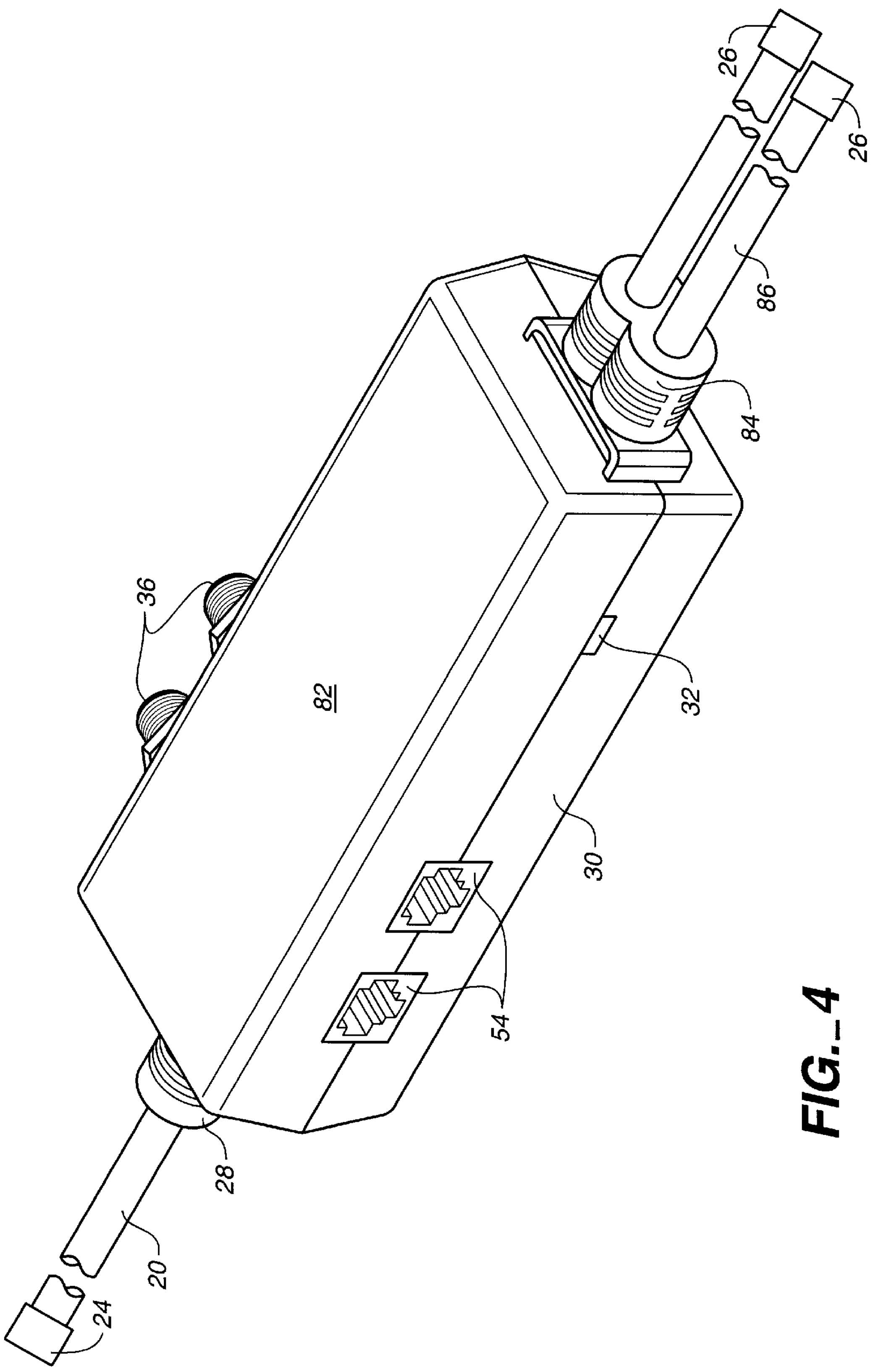
FIG. 4 is a cutaway perspective view of an electric cord with integral surge protection circuitry of this invention, with a single male/dual female AC power cordset with surge protection built in for AC power, telephone line (modem) and CATV coaxial cable.

FIG. 4 is a cutaway perspective view of an electric cord with integral surge protection circuitry 82 of this invention, including AC power cord (in) 20, AC power plug (in) 24 (such as a NEMA male plug), AC power plug (out) 26 (such as a dual IEC female plug), strain relief 28, enclosure 30, LED indicator light 32, coaxial cable connections 36, phone jacks (female) 54, dual cord strain relief 84, and dual AC power cord (out) 86.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. An electrical cord with integral surge protection circuitry comprising:

a standard cordset having a length, a middle, a first end and a second end;

a power line surge protection circuit installed in the middle of said cordset along said length and between said first end and said second end; and a plug connected to said first end at least some distance from said power line surge protection circuit.

2. The electrical cord with integral surge protection circuitry of claim 1 wherein said power line surge protection circuit further includes means for telephone line surge protection installed in the middle of said cordset along said length and between said first end and said second end, and electrically isolated from said power line surge protection circuit.

3. The electrical cord with integral surge protection circuitry of claim 1 wherein said power line surge protection circuit further includes means for coaxial cable surge protection installed in the middle of said cordset along said length and between said first end and said second end, and electrically isolated from said power line surge protection circuit.

4. The electrical cord with integral surge protection circuitry of claim 1 wherein said power line surge protection circuit further includes an equipment plug connected to said second end at least some distance from said power line surge protection circuit.

* * * * *